Patented Oct. 10, 1939

2,175,980

UNITED STATES PATENT OFFICE 2,175,980

MEDICINAL COMPOUND AND METHOD OF PREPARING SAME

Grover D. Turnbow, Oakland, Calif.

No Drawing. Application November 12, 1935, Serial No. 49,399

6 Claims. (Cl. 157—53.1)

This invention relates to medicinal compounds such as insecticides, parasiticides or fungicides.

In its broadest aspect, the invention contemplates a medicinal preparation of this character containing a volatile and/or soluble toxic ingredient which is stabilized, so to speak, whereby the dispersion or loss of the toxic ingredient is retarded, thus prolonging the period of time over which the preparation will retain its lethal properties.

For instance, nicotine and nicotine compounds have heretofore been used as insecticides or parasiticides, but by reason of the nicotine being very unstable in the presence of other chemical compounds, as in mixed insecticidal and fungicidal sprays, the toxic effect of the nicotine is retained by the compound for very short periods of time. Efforts have also been made to retain nicotine with other materials by adsorption, but here the preparations were such that the nicotine was readily liberated by dilute alkaline solutions and, as a consequence, its usefulness as an insecticide was of very short duration. The present invention, therefore, provides a new compound or preparation containing nicotine or other lethal substance, but which is of great stability.

More specifically, the invention contemplates a medicinal compound of the character described consisting of nicotine combined with a carrier such as casein, the compound being stabilized with a stabilizing agent such as formaldehyde. Another instance of the applicability of the broad principle of the invention is a compound of copper and casein as a vehicle treated with a stabilizing agent whereby the solubility of the copper is reduced to the point desired, depending upon the use to be made of the compound. Likewise, if desired, the compound can include both the nicotine and copper, which will also serve as an accelerating agent, so far as concerns the activity of the nicotine.

The following method has been found entirely satisfactory for the preparation of a nicotine compound. Approximately nineteen pounds of casein is added to five gallons of water in a suitable container, the water being preferably warm to facilitate the taking up of the casein. Tap water could, of course, be used without having its temperature raised, but this would slow up the carrying out of the process. In another container, between three and one-half and four pounds, preferably approximately three and three-quarter pounds of nicotine sulphate (commercial "Black Leaf 40") is mixed with one gallon of water, to which is added, while the solution is agitated, as by stirring, about three hundred grams of 26° Baumé ammonium hydroxide. The solution, upon addition of the ammonium hydroxide, will become a lighter brown. This "Black Leaf"-ammonium mixture is added to the casein-water mixture, previously described, additional water being added from time to time, the amount of water added depending upon the method to be employed for drying the product. If the product is to be air-dried, a total volume of approximately twelve gallons of solution of uniform consistency is adequate. If it is to be passed through a drier or desiccating apparatus for substantial instantaneous dehydration, the volume may be increased to eighteen gallons. In other words, the amount of water added at the time the nicotine solution and the casein-water mixture are brought together will vary with the drying procedure adopted. In all instances, the entire mixture is preferably heated, as with direct steam, to about 140° F., the material being constantly agitated during heating. When all the material thus described has gone into solution and the latter has obtained uniform color and consistency, one-half pound of formaldehyde (40%), mixed with an equal quantity of water, is slowly added to the solution, the latter being vigorously agitated during this step. The amount of formaldehyde used will, of course, vary, depending upon the degree of stabilization desired in the finished product, this characteristic, in turn, being indicated by the use to be made of the product. Also, the particular mode of drying the product to be employed is a factor in determining the amount of formaldehyde used. For instance, if it is to be air-dried, it may be preferable to use sufficient formaldehyde to form a gel, the product in this condition being exposed, on suitable containers, for dehydrating. On the other hand, if spray-drying is employed, less formaldehyde is preferably used and it is necessary to have sufficient water in the material and to keep the material agitated to prevent the formation of a gel. The product obtained by spray-drying is a finely divided powder and when air-drying is used the product is ground to particles of suitable size.

The finely divided material may be used for making tablets or pills, or may be used by simply mixing in with the feed of the fowls to be treated. When made into tablets or pills, it may be suitably colored with a dye, such as methylene blue, or, if used in granular form, it may be dyed to resemble the feed.

Substantially the same product has been made up using nicofume as the nicotine source, in lieu of "Black Leaf 40". "Nicofume" is the proprietary name for a water solution containing 40% free nicotine. In this instance, approximately twenty-five pounds of casein; one hundred pounds of warm water; and five pounds of nicofume were used. Approximately three-fourths of the water was added to the casein, making a solution of rather low viscosity. The nicofume, containing approximately forty per cent (40%) nicotine, was mixed with the remainder of the water, after which this was mixed with the casein solution and the entire mixture stirred or agitated while heated in a suitable container to approximately 50° to 54° C. In ten or fifteen minutes substantially all of the casein is in solution. Then, while continually stirring, formaldehyde was added, the amount of formaldehyde used being dependent on the factors referred to in the preceding example. For use with fowls, such as chickens, approximately four pounds of formaldehyde (37%) was used in the present example, and very excellent results attained. This product forms a very stiff gel almost immediately and, in commercial operations should usually be allowed to set for a few hours and ground and dried, the grinding facilitating drying. After drying, the product of this example weighed approximately twenty-nine pounds and was run through a grinding mill and reduced to desired granular size.

Either of the foregoing products can be fed in granular form or in pellet form to fowls in substantial quantities without noticeable signs of toxicity and due to stabilization of the otherwise volatile nicotine ingredient, the product will retain its medicinal properties over a greatly increased period of time.

This broad principle of retarding the loss of the toxic ingredient of medicinal compounds of the type specified is also applicable where said ingredient is subject to dissipation by reason of its solubility. For instance, a fungicide having copper therein may be treated to increase the length of time over which it will retain its lethal properties. An actual example is as follows: Ten pounds of copper sulphate was added to forty pounds of water, the latter being comparatively warm and the mixture kept warm and stirred until the copper sulphate was dissolved. To this solution there was then added ammonium hydroxide, approximately ten pounds being added. In this solution the copper content would then be present in the form of copper hydroxide, due to the chemical reaction between the copper sulphate and ammonium hydroxide. Five pounds of casein was likewise mixed with twenty pounds of warm water. The two solutions were then mixed together, forming a copper caseinate to which formaldehyde was then added, while agitating the solution. Approximately two pounds of formaldehyde was used for the quantity of solution mentioned. After the mixing of the formaldehyde, the material was dried as in the former instances. This copper caseinate, preferably used as a fungicide, is found to retain its fungicidal properties over a much greater length of time, compared to one not treated with formaldehyde, due to the fact that the copper had been stabilized in the sense that its solubility was retarded. Here, again, the degree of solubility will vary according to the use to be made of the compound, its solubility being variable by the quantity of formaldehyde used.

If desired, copper and nicotine may both be included in one preparation in the form of a nicotine copper caseinate whose active ingredients will be stabilized, so far as concerns solubility and volatility, by the addition of formaldehyde. Where this, so-called double caseinate is prepared, the copper will also function as an accelerator, increasing the activity of the nicotine.

As stated, the invention in its broader aspects, contemplates medicinal compounds of the type described, wherein the active ingredient is stabilized as to volatility and solubility to the extent required or desired, depending upon the use to be made of the product and the invention is not to be limited to any particular ingredients or agents except as indicated in the appended claims. In this connection, it might be added that other stabilizing agents such as mercuric chloride and potassium dichromate may be used in place of the formaldehyde. Likewise, another form of the carrier, in lieu of casein, would be albumin.

The present nicotine compound is of such stability that it may be used as a stomach poison, replacing many of the poisons now used for that purpose—the arsenates, for example, arsenate of lead—and it is of such a nature as to be very much less objectionable than the arsenates. Also, the present products instead of being used in granulated form or in pellets, may be used by the usual spraying or dusting methods.

What I claim is:

1. The method of preparing a substantially stable compound of nicotine which consists in dissolving casein in nicotine and thereafter adding thereto formaldehyde in sufficient quantity to render the resulting product substantially insoluble.

2. A substantially stable composition containing casein combined with nicotine and formaldehyde, the formaldehyde being present in an amount sufficient to render said composition of reduced solubility.

3. A substantially stable composition containing casein combined with copper hydroxide, and formaldehyde, the degree of stability of the combined casein and copper hydroxide being determined by the formaldehyde content of the composition.

4. A substantially stable composition containing casein combined with nicotine and copper hydroxide and formaldehyde, the nicotine being diffusible in normal use of the composition, and the degree of stability of the combined ingredients being determined by the formaldehyde content of the composition.

5. A substantially stable composition containing nicotine combined with a protein selected from a group consisting of casein and albumen, and formaldehyde, the degree of stability of the combined ingredients being determined by the formaldehyde content of the composition.

6. A substantially stable composition containing nicotine and copper hydroxide combined with a protein selected from a group consisting of casein and albumen, and formaldehyde, the degree of stability of said combined ingredients being determined by the formaldehyde content of the composition.

GROVER D. TURNBOW.